United States Patent [19]

Ten Pierick et al.

[11] Patent Number: 5,444,500

[45] Date of Patent: Aug. 22, 1995

[54] DISPLAY DEVICE INCLUDING A CORRECTION CIRCUIT, AND CORRECTION CIRCUIT FOR USE IN A DISPLAY DEVICE

[75] Inventors: Hendrik Ten Pierick, Eindhoven; Jan G. Prummel, Zierikzee, both of Netherlands

[73] Assignee: U.S. Philips Corporation, New York, N.Y.

[21] Appl. No.: 153,383

[22] Filed: Nov. 16, 1993

[30] Foreign Application Priority Data

Nov. 17, 1992 [EP] European Pat. Off. ............ 92203512

[51] Int. Cl.⁶ ........................ H04N 3/32; H04N 5/59
[52] U.S. Cl. ................... 348/807; 315/371; 315/368.18; 315/368.17; 348/806
[58] Field of Search ............... 348/626, 222, 625, 252, 348/673, 806, 807; 315/371, 368.11–368.22; H04N 3/32, 5/59

[56] References Cited

U.S. PATENT DOCUMENTS

| | | | |
|---|---|---|---|
| 3,949,166 | 4/1976 | Fuse | 348/626 |
| 4,170,785 | 10/1979 | Yoshida et al. | 358/242 |
| 4,549,216 | 10/1985 | Yuki et al. | 348/806 |
| 4,551,653 | 11/1985 | Hilsum | 348/807 |
| 4,687,973 | 8/1987 | Holmes et al. | 315/368.13 |
| 4,982,287 | 1/1991 | Lagoni | 348/673 |

FOREIGN PATENT DOCUMENTS

| | | | |
|---|---|---|---|
| 164765 | 7/1988 | Japan | H04N 3/32 |
| 2273425 | 6/1994 | United Kingdom | H04N 5/59 |

*Primary Examiner*—James J. Groody
*Assistant Examiner*—Glenton B. Burgess
*Attorney, Agent, or Firm*—Edward W. Goodman

[57] ABSTRACT

To improve the sharpness of (video) pictures to be displayed on a display screen of a display device, it is known to use scan velocity modulation. The drawback of scan velocity modulation is that an improvement of the (impression of) sharpness is obtained in given types of video signal/pictures only. By starting from the properties of the display tube when improving the (impression of) sharpness of the displayed picture, a much better improvement can be obtained. Information about the relevant display tube is applied to a correction circuit which also receives a video signal-dependent signal. With reference to these input signals, the correction circuit determines whether and how the video signal is to be corrected so as to obtain an ideal picture on the display screen. Reducing the contrast is a first step of restoring the resolution. Modulating the read clock of the video signal is a second step. Using scan velocity modulation is the last step. The correction circuit determines/computes one clock signal which is applied to a contrast control circuit, a clock modulator and a scan velocity modulator, respectively.

9 Claims, 3 Drawing Sheets

DISPLAY DEVICE INCLUDING A CORRECTION CIRCUIT, AND CORRECTION CIRCUIT FOR USE IN A DISPLAY DEVICE

BACKGROUND OF THE INVENTION

1. Field of the Invention

The invention relates to a display device having an input for receiving an input video signal, a video signal processing circuit for processing the input video signal to an output video signal, said video signal processing circuit having an output for applying the output video signal to a display tube of the display device, a deflection unit for deflecting at least one video signal-dependent beam current generated in the display tube, and a correction circuit for correcting the video signal to be displayed.

2. Description of the Related Art

The invention also relates to a correction circuit.

A generally known system of improving the sharpness of a displayed (video) picture on a display screen is referred to as aperture correction. In this system the contours of an object are enhanced by means of an undershoot and an overshoot. Another generally known system of improving the sharpness of a displayed (video) picture on the display screen is referred to as scan velocity modulation. In this system the scan velocity of the electron beam currents is adapted in dependence upon the video signal so as to improve the (impression of) sharpness.

A display device in which the correction circuit includes a scan velocity modulator is known, for example from U.S. Pat. No. US-A 4,170,785. The derivative of the video signal is determined, whereafter a signal related to the derivative is applied to the scan velocity modulation coils for correcting/improving the (impression of) sharpness on the display screen.

A drawback of this display device known from said United States Patent is that the improvements only occur in given types of (video) pictures, whereas for other types of pictures the picture, displayed on the display screen is degraded.

SUMMARY OF THE INVENTION

It is, inter alia an object of the invention to obviate the above-mentioned drawback. It is a further object of the invention to provide a display device and a correction circuit which displays an optimum picture on the display screen, independently of the relevant display tube. To this end, a display device according to the invention is characterized in that the correction circuit has a first input for receiving a display tube-dependent signal, a second input for receiving a video signal-dependent signal, the correction circuit generating, with reference to these signals, a correction signal to be supplied from an output which is coupled to a correction input of the video signal processing circuit.

The displayed picture can be essentially improved by starting from the properties of the display tube and determining, with reference thereto, which type of signal can be displayed on the display screen and how the (video) signal to be displayed is distorted. Before the video signal is applied to the display tube, it can be adapted to the relevant display tube by making use of the properties of this tube. Thus, such a video signal is applied to the display tube that it can be displayed without being hampered by the shortcomings of the display tube. This is in contrast to the known display devices including correction circuits performing only a correction which is optimum for one type of video signal but has a contrary effect for another type of video signal. The video signal can be improved in a much more effective manner by making use of the properties of the display tube and by applying these data as input signals to the correction circuit.

An embodiment of a display device according to the invention is characterized in that the correction circuit includes a computing unit for determining a beam current measuring signal having a value which corresponds to the beam current to be generated in the display tube, and a comparison unit for comparing the beam current measuring signal with a reference signal, the correction circuit being adapted to generate the correction signal in dependence upon the comparison. By determining the beam current measuring signal, it is ascertained whether this beam current is possible for this type of video signal and this type of display tube, (i.e. whether this display tube can display this beam current without any loss of resolution), and if not, the contrast of the video signal is reduced (beam current reduction) by means of the correction signal.

An embodiment of a display device according to the invention is characterized in that the output of the correction circuit is coupled to a contrast control circuit of the video signal processing circuit for controlling the contrast in dependence upon the correction signal.

An embodiment of a display device according to the invention is characterized in that the output of the correction circuit is coupled to a read clock of a memory of the video signal processing circuit for modulating the read rate of the video signal in dependence upon the correction signal. This yields a time-axis correction of the video signal.

An embodiment of a display device according to the invention is characterized in that the output of the correction circuit is coupled to a scan velocity modulator associated with the display device for modulating the deflection rate. The sharpness is essentially improved by using scan velocity modulation after the beam current has been reduced (if necessary).

A further embodiment of a display device is characterized in that the correction circuit includes a low-pass filter for generating the correction signal in dependence upon the beam current measuring signal and in dependence upon the display tube-dependent signal. Such a display device is generally known. There are widespread and continuous activities to improve the display of video signals on the display screens of display devices and to correct the displayed video signal.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENT

Figure 1:
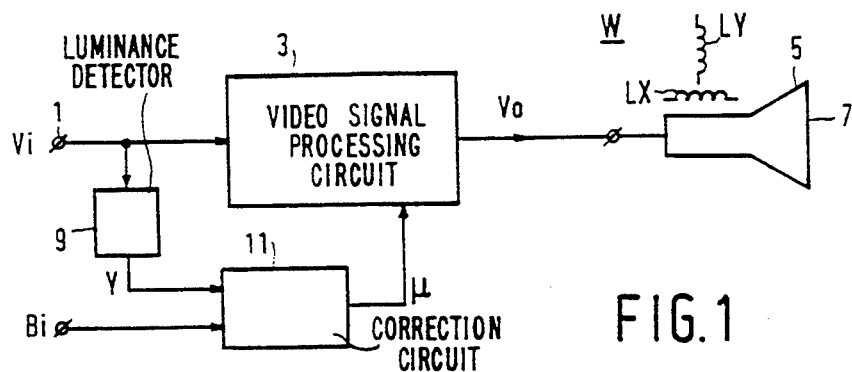
FIG. 1 is a block diagram of a display device according to the invention.

FIG. 1 shows (a block diagram of) a display device W. An input 1 of the display device receives an input video signal Vi. This input video signal may comprise, for example, the three color components R, G and B (or the components Y, U and V) if the display device includes a color display tube. The input 1 is coupled to a video signal processing circuit 3. In the video signal processing circuit, the incoming video signal is converted to an output video signal Vo which is suitable to be applied to a display tube 5 and to be displayed on a display screen 7. The input video signal is also applied to a luminance detector 9. Starting from the incoming video signal Vi in the form of the three color components R, G and B, the luminance component Y is determined in this luminance detector (if the incoming video signal comprises the components Y, U and V, the luminance detector 9 is not required). The luminance component Y is subsequently applied to a correction circuit 11. Instead of the luminance component Y, it is also possible to choose, for example, the largest of the three components R, G and B. A second input of the correction circuit receives a display tube-dependent signal Bi. This signal Bi comprises information about the display tube 5, for example relating to the frequency characteristic, resolution, etc., and may apply, via a bus, the required data about the display tube to the correction circuit. The correction circuit 11 determines a correction signal $\mu$ with reference to the two input signals Y and Bi, which correction signal is applied as a second input signal to the video signal processing circuit 3. Substantially two components of the luminance component Y of the video signal are important for computing a correction signal, viz. the average DC level and the frequency of the AC component. These two elements determine the greater part of the size of the spot on the display screen of the display tube, hence the (impression of) sharpness of the displayed picture. For computing the correction signal (in the correction circuit 11) these two elements of the luminance component of the video signal, as well as the display tube-dependent signal Bi are of great importance.

Figure 2:
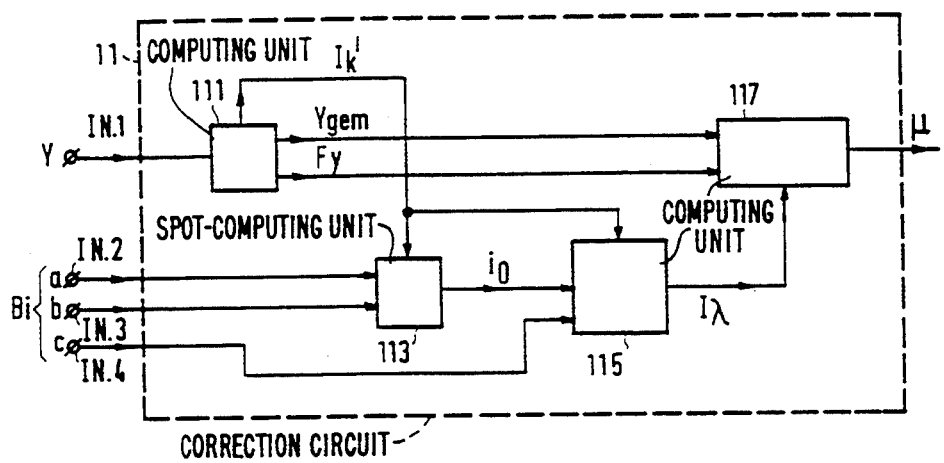
FIG. 2 shows an embodiment of a correction circuit for use in a display device according to the invention.

FIG. 2 shows an embodiment of the correction circuit 11 in greater detail. A first input IN.1 of the correction circuit receives the luminance component Y of the video signal (or a signal related thereto). A computing unit 111 computes at any instant of a video line to be displayed (or for each portion of a video line), an average value Ygem and the frequency Fy of the luminance component. The computing unit 111 further computes the value of the cathode current Ik' which would flow in the display tube 5 with this luminance component. The signal Ik' is applied to a spot-computing unit 113. The spot-computing unit computes with reference to the signal Ik' and two input signals having the values a and b (which form part of the display tube-dependent signal Bi and are applied to the correction circuit via inputs IN.2 and IN.3). The size of the spot ro which would occur at these input signals is computed with reference to the formula $$ro = a*Ik' + b$$

in which b is the initial spot size and a is the spot growth coefficient. These input values a and b are display tube-dependent and may be stored, for example in a ROM, etc. The data about the display tube may be stored in, for example the ROM, for example during manufacture of the display device, which data are supplied by the manufacturer of the display tube. By making use of the display tube data, it can be avoided that it is attempted, in operation, to display a (video) signal on the display screen, which signal cannot principally be displayed by means of the relevant display tube in view of the display tube properties. As will be further described in detail, it is necessary to take the properties of the display tube in the correction computations into account so as to obtain an essentially improved displayed picture. A fourth input IN.4 of the correction circuit 11 receives a signal X which is a measure of the sharpness of the picture on the display screen, and which is computed by taking the ratio of the "realized" luminance variations divided by the "envisaged" luminance variations, also referred to as modulation depth. An optimally sharp picture is obtained at a modulation depth $\lambda = 100\%$. The signal X is applied to a further computing unit 115. This computing unit further receives the signal ro and the signal Ik'. With reference to these three input signals, this computing unit computes the maximum admissible cathode beam current I$\lambda$ and applies this signal to an output which is coupled to a further computing unit 117. With reference to the signal I$\lambda$, Ygem and Fy (or with reference to I$\lambda$ and Ik'), this computing unit determines the correction signal $\mu$ which is defined by the formula $$\mu = I\lambda / Ik'$$

As described with reference to FIG. 1, the correction signal $\mu$ is applied to the video signal processing circuit 3.

Instead of the embodiment of the correction circuit 11 described with reference to FIG. 2, it is alternatively possible to realize the correction circuit by making use of a FIR filter (Finite Impulse Response) having variable coefficients or a variable delay time. The FIR filter is used as a low-pass filter and is intended to simulate the frequency characteristic of the display tube. The correction signal $\mu$ is intended to limit the cathode beam current before the display tube can do this. By simulating the low-pass characteristic of the display tube with the aid of the FIR filter, the cathode beam current can be corrected for obtaining a maximum resolution.

Figure 3:
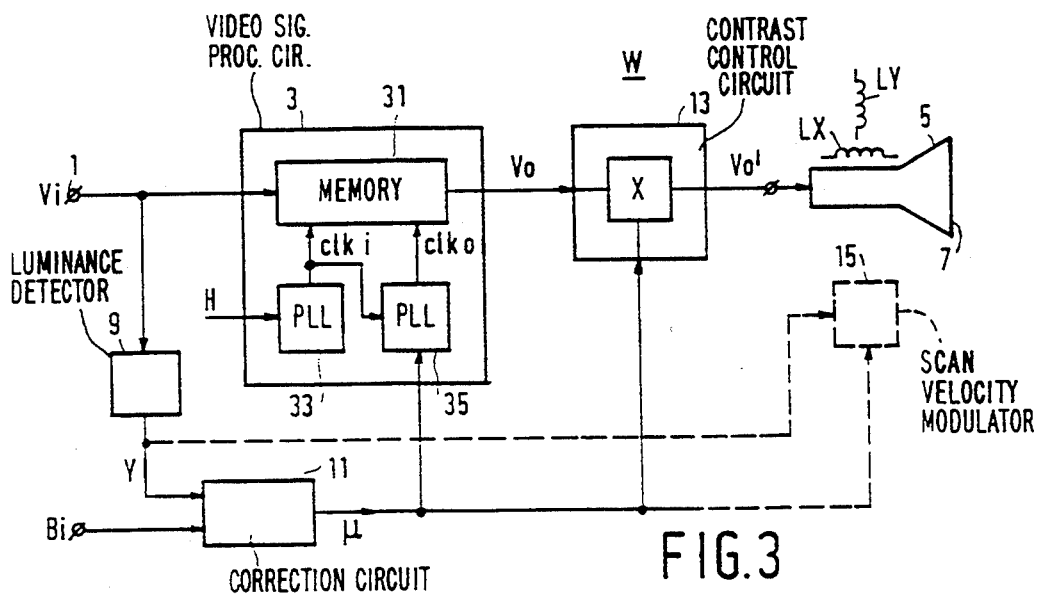
FIG. 3 shows an embodiment of a display device in greater detail.

FIG. 3 shows an embodiment of a display device W in greater detail and elements having the same reference numerals as in FIG. 1 and/or 2 have the same function.

The video signal processing circuit 3 is shown in greater detail in this Figure. An input 1 of the display device W again receives the input video signal Vi which, in the video signal processing circuit, is written into a memory 31 under the control of a first clock signal clki (from a first PLL 33). The memory may be, for example, in the form of a delay line. Under the control of a second clock signal clko (from a second PLL 35), the video signal is read from the memory at a variable clock rate and applied as output video signal Vo to a contrast control circuit 13. A second input of the contrast control circuit receives the correction signal $\mu$ from the correction circuit 11. The output video signal is multiplied by the correction signal μ in the contrast control circuit, so that the video signal applied to the display tube 5 has a contrast which is suitable for the relevant display tube and for the relevant video signal. The correction signal μ may also be applied to a scan velocity modulator 15 which modulates the deflection rate generated by deflection coils Lx and Ly and a deflection unit (not shown), so that the horizontal deflection rate is varied during light/dark transitions etc., which transitions are displayed more sharply due to the scan velocity modulation.

Figure 4A:
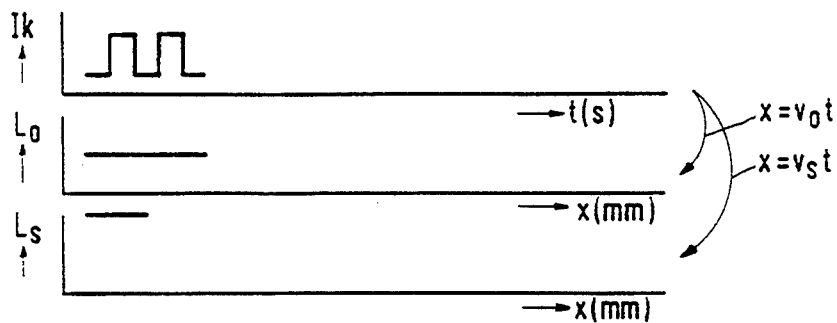
FIGS. 4a–4c shows time diagrams to explain the different steps of the correction process.
Figure 4B:
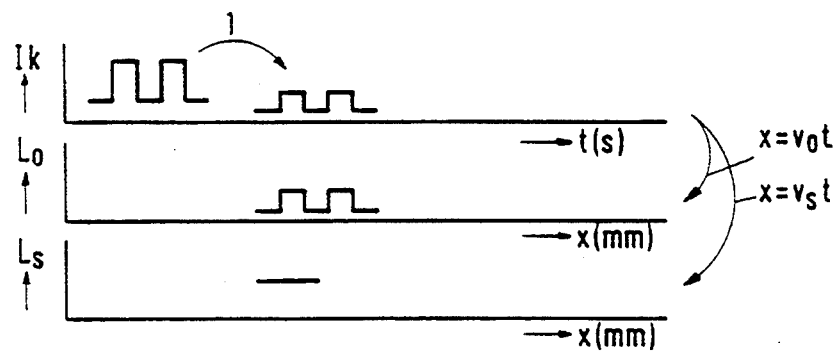
Figure 4C:
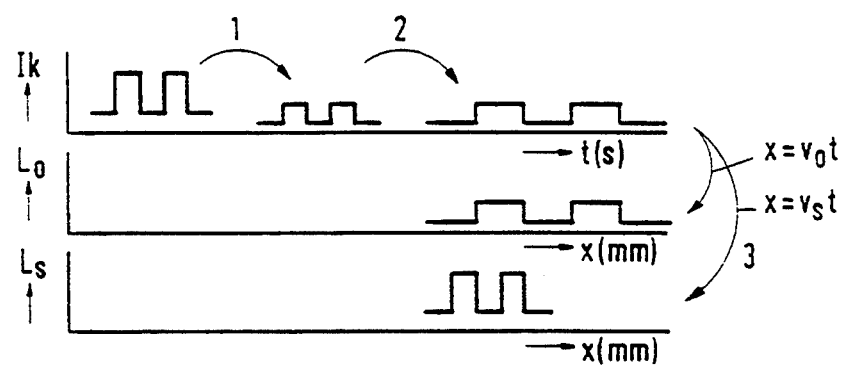

FIG. 4 shows diagrammatically an example of a pulsatory cathode current Ik and the resultant luminance divisions on the display screen for "normal" operation, i.e. without corrections (FIG. 4a), with a limitation of the cathode current (FIG. 4b) and with the corrections as described with reference to FIG. 3 (FIG. 4c), respectively. By way of example, the cathode current Ik is taken a factor of two too large (extreme case) in FIG. 4.

FIG. 4a shows that it cannot be expected that anything is left of luminance variations if the average cathode current of the supplied video signal is a factor of two too large. FIG. 4a shows that the AC variation in the cathode current is not converted into a luminance variation on the display screen. As expected, the luminance response in the normal case (Lo) does not show any variation. The average value of the luminance is, however, correct. If the scan velocity is reduced by a factor of two, the luminance response does not show any variation either (Ls).

FIG. 4b shows the first step of the correction process, viz. reducing of the (too large) cathode current Ik (halving in this example). If this halved cathode current is applied to the display tube, the luminance variation (Lo) on the display screen will (as expected) correspond to the halved cathode current. By subsequently halving the scan velocity, a correct average luminance is obtained, however, without any variation and consequently the resolution is lost again (Ls).

FIG. 4b shows that a limitation of the cathode current Ik followed by scan velocity modulation does not yield the desired effect. To solve this problem, a time-axis correction must be performed before scan velocity modulation is used.

FIG. 4c shows the complete correction process:
1. limitation of the cathode current Ik;
2. time-axis correction, in this case frequency halving;
3. scan velocity modulation.

The correction signal μ as generated in the correction circuit 11 is used for all three steps of the correction process. The cathode current Ik is limited by multiplying the output signal Vo by the correction signal/x. As described above, the correction signal μ is also applied to the video signal processing circuit 3 for modulating the read rate clko for reading the video signal from the memory 31 (time-axis correction). The scan velocity of the cathode ray is modulated by applying the correction signal μ to the scan velocity modulator 15.

Figure 5:
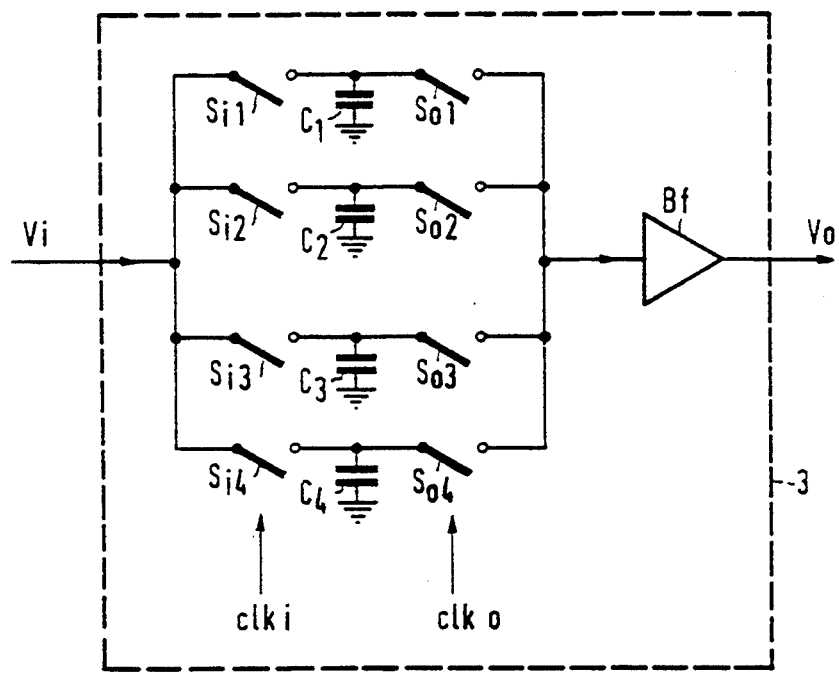
FIG. 5 shows an embodiment of a memory for use in a display device according to the invention.

FIG. 5 shows an embodiment of a memory 3 in the form of a delay line. The input video signal Vi is applied to input switches Si1–Si4, which switches are closed one by one under the control of the input clock clki. If the relevant input switch is closed, a sample of the input video signal is taken and stored in the relevant capacitor C1–C4. The input clock clki is a clock having a fixed frequency (an embodiment for generating the input clock signal clki and the output clock signal clko is further described with reference to FIG. 3). Each capacitor has one terminal connected to the respective input switch. These terminals are also connected to output switches So1–So4. These output switches are controlled by the output clock signal clko, which clock signal controls the output switches in such a way that they are closed one by one so that the samples stored in the capacitors under the control of the input clock are read one by one. The other terminals of the output switches are interconnected. The junction point is connected to an input of a buffer amplifier Bf which supplies the output video signal Vo.

Figure 6:
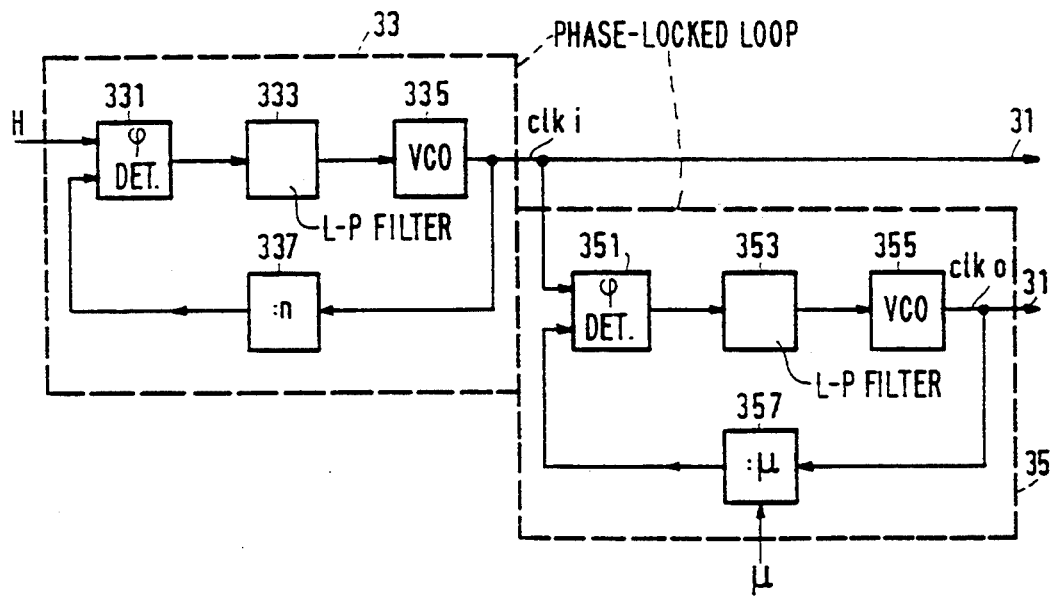
FIG. 6 shows an embodiment of an input clock and an output clock for use in a display device according to the invention.

FIG. 6 shows an embodiment of the first and the second PLL 33 and 35 which generate the input clock signal clki and the output clock signal clko, respectively. The PLL 33 has an input which applies a horizontal synchronizing signal H to a phase detector 331. A second input of the phase detector receives a signal from a divider 337. An output of the phase detector applies a signal, which is dependent on the phase difference between the two input signals, to a low-pass filter 333. An output of the low-pass filter is connected to an input of a voltage-controlled oscillator 335 which supplies the (input) clock signal clki at an output. The output of the voltage-controlled oscillator 335 is also coupled to an input of the divider 337 which divides the frequency of the clock signal clki by n.

The voltage-controlled oscillator 335 generates a clock signal clki at a frequency of, for example, $580 \times$ the line frequency with which the samples of a video line are determined. The output of the voltage-controlled oscillator 335 is also coupled to an input of the second PLL 35. The input clock signal clki is applied to a second phase detector 351, a second input of which receives a signal from a second divider 357. An output of the phase detector 351 supplies a signal which is dependent on the phase difference between the two input signals. The output of the second phase detector 351 is coupled to a second low-pass filter 353 having an output coupled to a second voltage-controlled oscillator 355. An output of the voltage-controlled oscillator supplies the (output clock signal clko. The output is also coupled to an input of the divider 357. The divider 357 divides the clock signal clko by the value of the correction signal μ which correction signal is applied to a second input of the divider. As described above, the output of the divider is connected to the second input of the phase detector, with which the control loop of the PLL 35 is closed.

Figure 7:
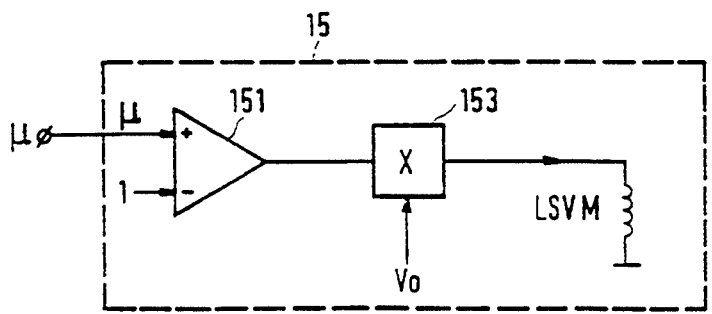
FIG. 7 shows an embodiment of a scan velocity modulator for use in a display device according to the invention.

FIG. 7 shows an embodiment of the scan velocity modulator 15. An input of the scan velocity modulator receives the correction signal μ from the correction circuit 11, which signal is applied to an input of a differential amplifier 151. A second input of the differential amplifier conveys a signal of the value "1". An output of the differential amplifier supplies a signal (μ−1). This signal is multiplied in a multiplier 153 by a signal vo which represents the original scan velocity. Thus, a signal (μ−1)*vo is applied to a scan velocity modulation coil Lsvm. The overall scan velocity will then be (μ−1)*vo+vo=μ*vo.

It will be evident that the embodiments described above may be adapted in all kinds of manners without departing from the scope of the invention.

We claim:

1. A display device having an input for receiving an input video signal, a video signal processing circuit for processing the input video signal to an output video signal, said video signal processing circuit having an output for applying the output video signal to a display tube of the display device, a deflection unit for deflecting at least one video signal-dependent beam current generated in the display tube, and a correction circuit for correcting the video signal to be displayed, characterized in that the correction circuit has a first input for receiving a signal conveying display tube characteristic data, and a second input for receiving a signal dependent on the input video signal, said correction circuit generating, with reference to the signals received at said first and second inputs, a correction signal to be supplied from an output of the correction circuit which is coupled to a correction input of the video signal processing circuit.

2. A display device as claimed in claim 1, characterized in that the correction circuit includes a computing unit for determining a beam current measuring signal having a value which corresponds to the beam current to be generated in the display tube, and a comparison unit for comparing the beam current measuring signal with a reference signal, the correction circuit being adapted to generate the correction signal in dependence upon the comparison.

3. A display device as claimed in claim 1, characterized in that the output of the correction circuit is coupled to a contrast control circuit of the video signal processing circuit for controlling the contrast in dependence upon the correction signal.

4. A display device as claimed in claim 1, characterized in that the output of the correction circuit is coupled to a read clock of a memory of the video signal processing circuit for modulating the read rate of the video signal in dependence upon the correction signal.

5. A display device as claimed in claim 1, characterized in that the output of the correction circuit is coupled to a scan velocity modulator associated with the display device for modulating a rate of deflection of said at least one video signal-dependent beam current generated in said display tube.

6. A display device as claimed in claim 1, characterized in that the correction circuit includes a low-pass filter for generating the correction signal in dependence upon the beam current measuring signal and in dependence upon the display tube-dependent signal.

7. A correction circuit for correcting a video signal to be displayed in a display device having an input for receiving an input video signal, a video signal processing circuit for processing the input video signal to an output video signal, said video signal processing circuit having an output for applying the output video signal to a display tube of the display device, and a deflection unit for deflecting at least one video signal-dependent beam current generated in the display tube, characterized in that the correction circuit has a first input for receiving a signal conveying display tube characteristic data, and a second input for receiving a signal dependent on the input video signal, said correction circuit generating, with reference to the signals received at said first and second inputs, a correction signal to be supplied from an output of the correction circuit.

8. A correction circuit as claimed in claim 7, characterized in that the correction circuit includes a computing unit for determining a beam current measuring signal having a value which corresponds to the beam current to be generated in the display tube, and a comparison unit for comparing the beam current measuring signal with a reference signal, the correction circuit being adapted to generate the correction signal in dependence upon the comparison.

9. A method of correcting a video signal to be displayed in a display device, said method comprising the steps:

generating at least one electron beam current in a display tube;

processing a received input video signal to obtain an output video signal, said output video signal coupled to modulate the at least one electron beam current; and generating a correction signal for correcting the input video signal, the correction signal being dependent on the input video signal, characterized in that the method further comprises the step:

receiving display tube characteristic data, and the step of generating the correction signal is dependent on the display tube characteristic data.

* * * * *